United States Patent
Lin et al.

(10) Patent No.: US 9,261,911 B2
(45) Date of Patent: Feb. 16, 2016

(54) DETACHABLE ELECTRONIC APPARATUS

(71) Applicant: COMPAL ELECTRONICS, INC., Taipei (TW)

(72) Inventors: Yu-Chieh Lin, Taipei (TW); Kang-Yeh Yu, Taipei (TW); Jung-Sheng Chiang, Taipei (TW); Han-Min Chen, Taipei (TW); Chen-Yu Chung, Taipei (TW); Chin-Chi Yeh, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 22 days.

(21) Appl. No.: 14/474,321

(22) Filed: Sep. 2, 2014

(65) Prior Publication Data

US 2015/0103483 A1 Apr. 16, 2015

Related U.S. Application Data

(60) Provisional application No. 61/890,324, filed on Oct. 14, 2013.

(51) Int. Cl.
*G06F 1/16* (2006.01)

(52) U.S. Cl.
CPC ............ *G06F 1/1632* (2013.01); *G06F 1/1626* (2013.01)

(58) Field of Classification Search
CPC ...................................... G06F 1/1632
USPC ................................... 361/679.41
See application file for complete search history.

(56) References Cited

U.S. PATENT DOCUMENTS

| | | | | |
|---|---|---|---|---|
| 8,582,289 B2* | 11/2013 | Zhou | ...................... | F16M 13/00 361/679.41 |
| 8,911,246 B2* | 12/2014 | Carnevali | .............. | G06F 1/1632 439/170 |
| 2012/0162902 A1* | 6/2012 | Zhou | ..................... | H01R 13/635 361/679.41 |
| 2012/0194993 A1* | 8/2012 | Oguchi | ................. | G06F 1/1632 361/679.41 |
| 2012/0206875 A1* | 8/2012 | Carnevali | .............. | G06F 1/1632 361/679.41 |
| 2012/0293949 A1* | 11/2012 | Zhou | ..................... | H01R 27/00 361/679.41 |
| 2013/0050934 A1* | 2/2013 | Zhou | ..................... | G06F 1/1632 361/679.43 |
| 2013/0163186 A1* | 6/2013 | Mizusawa | ................ | H05K 7/14 361/679.41 |
| 2014/0118923 A1* | 5/2014 | Stanley | ................. | G06F 1/1626 361/679.41 |
| 2015/0036283 A1* | 2/2015 | Suckle | ................. | G06F 1/1632 361/679.43 |

FOREIGN PATENT DOCUMENTS

| | | |
|---|---|---|
| CN | 201421867 Y | 3/2010 |
| TW | 201227230 A1 | 7/2012 |
| TW | 201321646 A1 | 6/2013 |

* cited by examiner

*Primary Examiner* — Anthony Q Edwards
(74) *Attorney, Agent, or Firm* — CKC & Partners Co., Ltd.

(57) ABSTRACT

A detachable electronic apparatus includes a tablet device and a base. The base includes a back plate and a rotatable supporting device pivoted on the back plate. The rotatable supporting device further includes a supporting bracket and a connector module floating connected to the supporting bracket. The connector module is protruded from an opening of the supporting bracket when the tablet device is against the back plate. The connector module is stored in the opening of the supporting bracket when the tablet device is separated from the back plate.

8 Claims, 7 Drawing Sheets

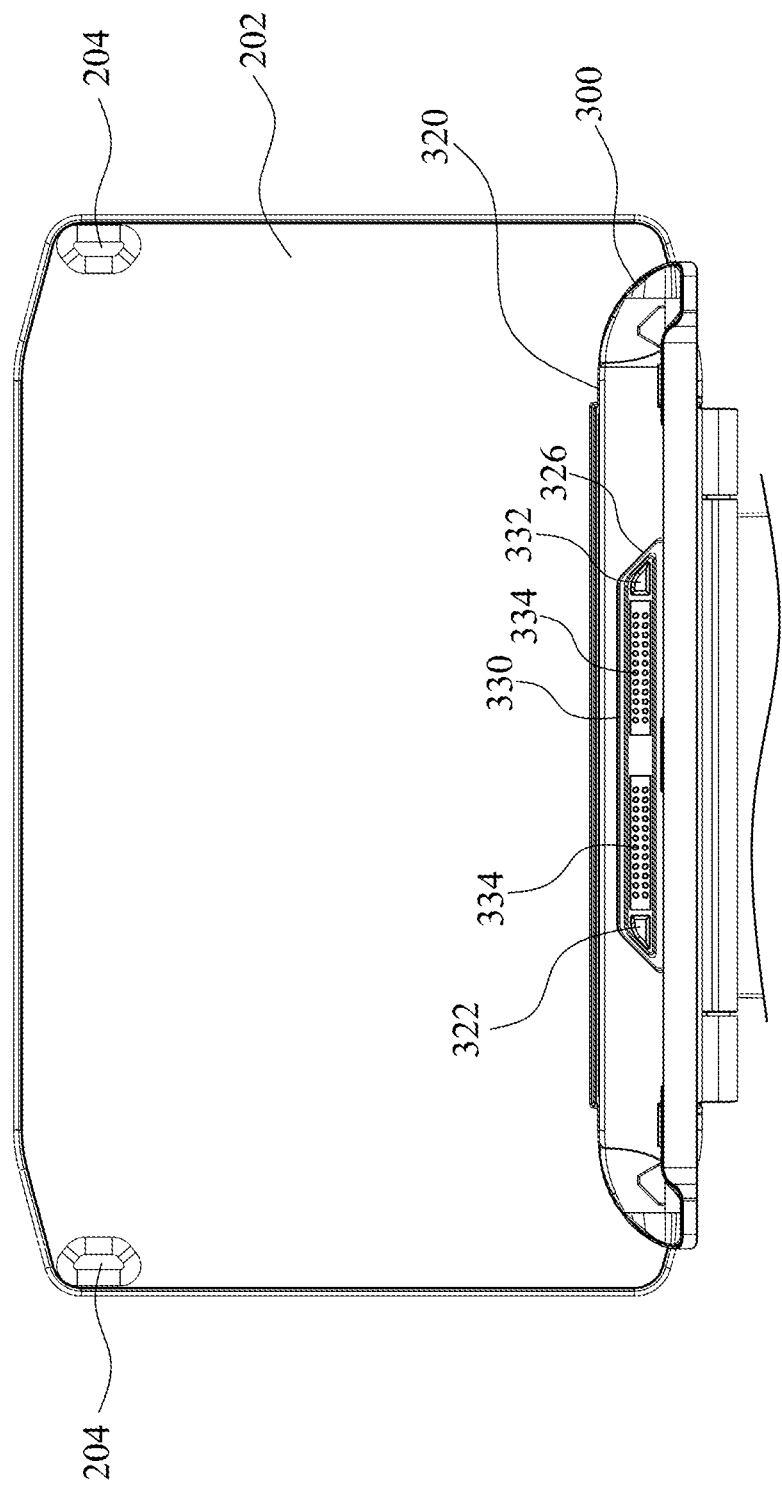

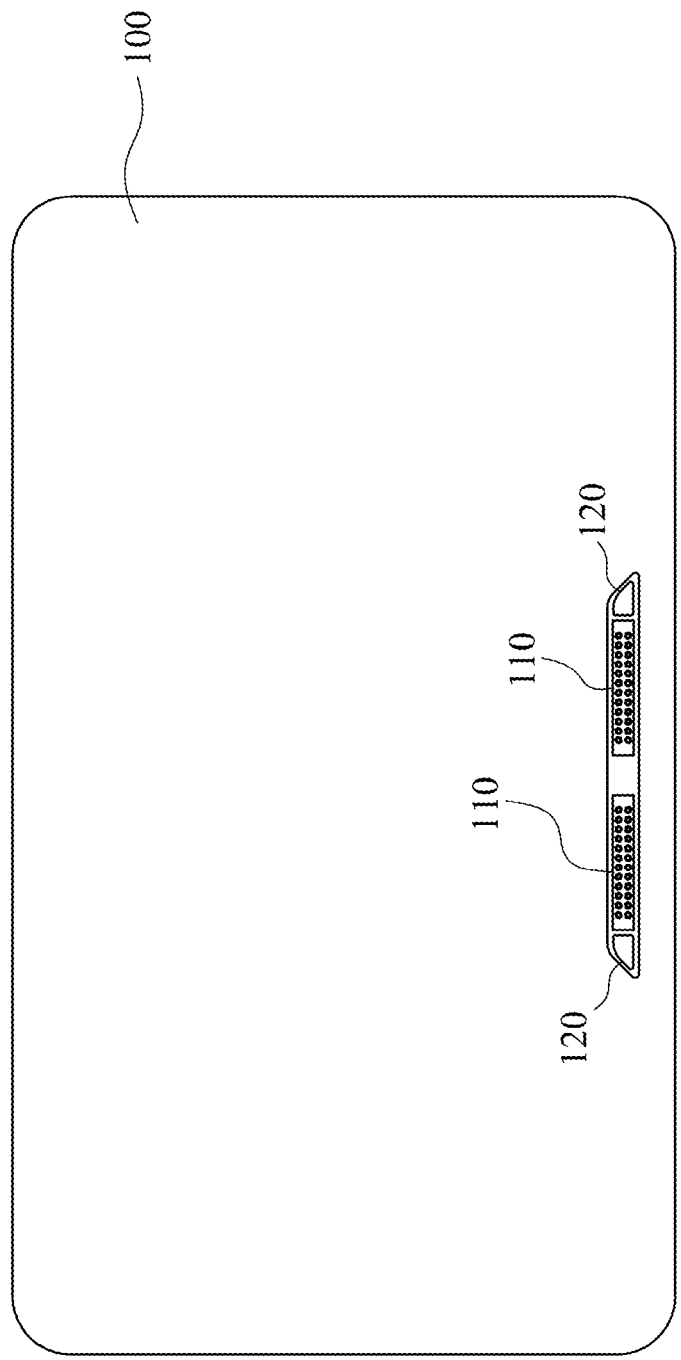

DETACHABLE ELECTRONIC APPARATUS

RELATED APPLICATIONS

This application claims priority to U.S. Provisional Patent Application Ser. No. 61/890,324, filed Oct. 14, 2013, which is herein incorporated by reference.

TECHNICAL FIELD

The present disclosure generally relates to a detachable electronic apparatus. More particularly, the present disclosure relates to a detachable All-in-One computer.

BACKGROUND

In recent years, due to the electronics changing with each passing day, the industry of manufacturing computer, communication, and consumer electronics products (3C products) have become the fastest growing up industry in the world.

Because the living space for the modern people is more limited, sometimes it cannot provide enough space to place a traditional desktop computer. Therefore, an integrated All-in-One computer is appeared, often referred to as the "AIO computer". The AIO computer fully integrates the hardware (e.g., CPU, motherboard, hard drive, monitor, speakers, video camera, etc.) in one body, especially the host is built in the screen.

The occupied space of AIO computer is similar to the occupied space of a liquid crystal display. In addition, the AIO computer can reduce the length of the electronic circuits for connecting the peripheral devices, and effectively save the space thereof. However, the AIO computer still needs a pedestal base to support the screen thereof, so that a user can only use the AIO computer at home, rather than easily carry out the AIO computer. Therefore, there is a need to have an AIO computer not only be operated at home and also be operated outside.

SUMMARY

One objective of the embodiments of the present invention is to provide a detachable electronic apparatus having a tablet device and a base, the tablet device able to easily separated from the base so that a user can conveniently uses the detachable electronic apparatus at home and can also conveniently carry out.

To achieve these and other advantages and in accordance with the objective of the embodiments of the present invention, as the embodiment broadly describes herein, the embodiments of the present invention provides a detachable electronic apparatus includes a tablet device and a base. The base includes a back plate and a rotatable supporting device pivoted on the back plate. The rotatable supporting device further includes a supporting bracket and a connector module, and the connector module is movable fixed on the supporting bracket, for example, the connector module is floatingly fixed on the supporting bracket. When the tablet device is in contact with the back plate, the connector module protrudes from an opening of the supporting bracket. When the tablet device is apart from the back plate by rotating the tablet device and the rotatable supporting device, the connector module withdraws into the opening of the supporting bracket.

In one embodiment, the back plate further includes a magnetic module to attract the tablet device on the back plate.

In one embodiment, the base further includes a stopper to push the connector module protruding from the opening of the supporting bracket.

In one embodiment, the rotatable supporting device further includes a spring disposed between the connector module and the supporting bracket to push the connector module withdrawing into the opening of the supporting bracket.

In one embodiment, the detachable electronic apparatus further includes a flexible circuit board connecting between the connector module and a circuit board of the base to electrically connect the tablet device and the circuit board of the base.

In one embodiment, the supporting bracket further includes a supporting base and a supporting arm.

In one embodiment, the back plate further includes an accommodating reservoir to receive the supporting base.

In one embodiment, the bottom side of the tablet device further includes a connecting socket and the connector module further includes a positioning device corresponding to the connecting socket.

The detachable electronic apparatus according to one embodiment of the present invention utilizes the rotatable supporting device equipped on the back plate of the base to conveniently couple to the tablet device to form an All-in-One computer. The rotatable supporting device can rotate around relative to the back plate of the base so that the connector of the rotatable supporting device can conveniently couple with or decouple from the corresponding connector of the tablet device. The back plate is further equipped with a magnetic module thereon to effectively fix the tablet device on the base. Furthermore, the tablet device can exactly couple to the base and the connector with the positioning device.

Hence, the tablet device and the detachable electronic apparatus according to one embodiment of the present invention can be an All-in-One computer while operating at a stationary place and the tablet device can be easily removed from the base to form a portable tablet device for users carrying and operating outside.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 3A illustrates a partial view of the base of the detachable electronic apparatus according to an embodiment of the present invention to describe the assembly processes of the detachable electronic apparatus;

FIG. 3B illustrates a back view of the tablet device of the detachable electronic apparatus according to an embodiment of the present invention to describe the assembly processes of the detachable electronic apparatus;

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
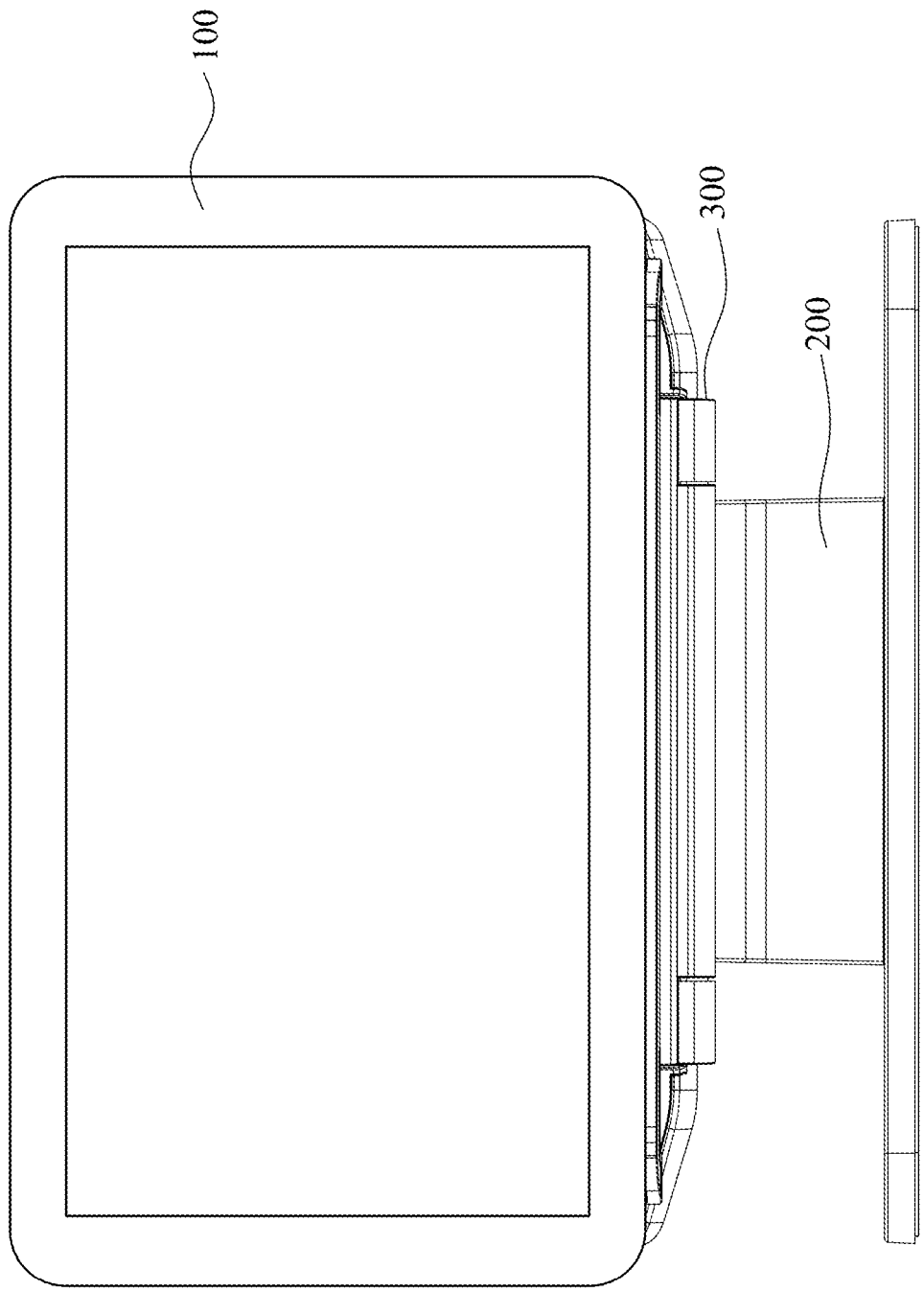
FIG. 1 illustrates a front view of a detachable electronic apparatus according to an embodiment of the present invention.
Figure 2A:
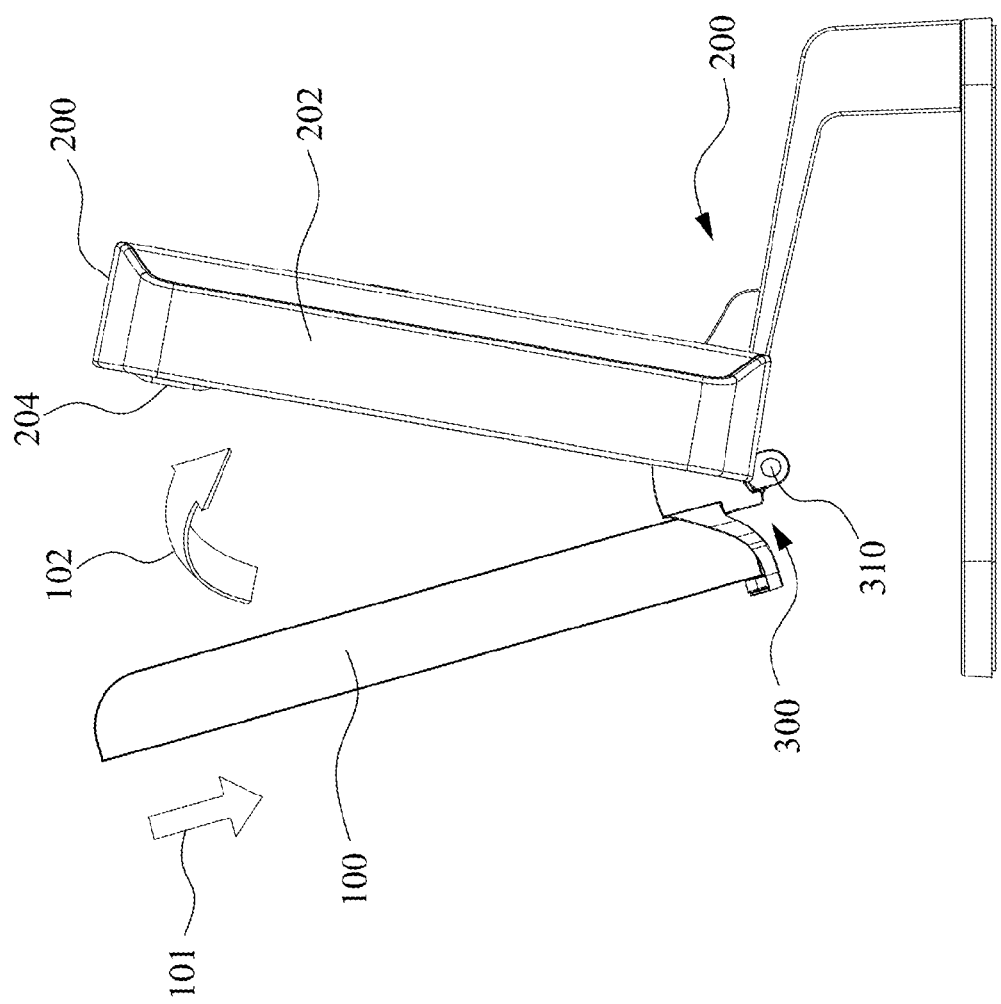
FIGS. 2A-2B illustrate side views of the detachable electronic apparatus according to an embodiment of the present invention to describe the assembly processes of the detachable electronic apparatus.
Figure 2B:
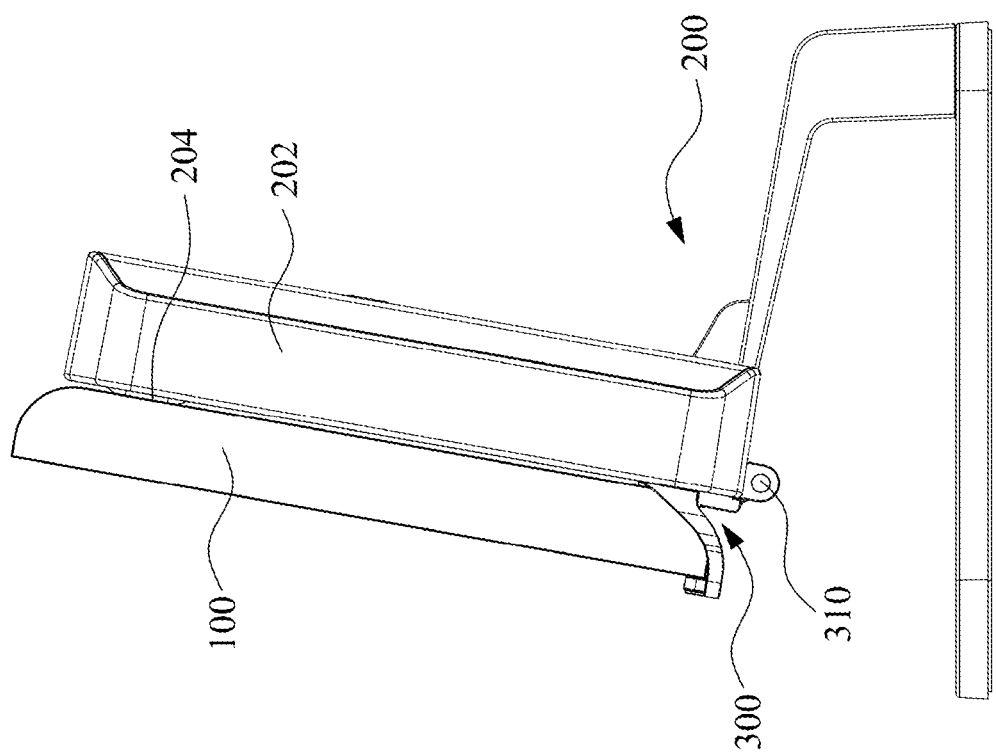

Refer to FIGS. 1, 2A and 2B. FIG. 1 illustrates a front view of a detachable electronic apparatus according to an embodiment of the present invention, and FIGS. 2A and 2B illustrate the side views thereof to describe the assembly processes of the detachable electronic apparatus.

The detachable electronic apparatus has a tablet device 100 and a base 200. In addition, a rotatable supporting device 300 is further equipped on the base 200 for fixing and supporting the tablet device 100.

Refer to FIG. 2A. While a user want to assemble the tablet device 100 on the base 200, the tablet device 100 is first disposed on the rotatable supporting device 300 along the direction of the arrow 101. Subsequently, referring to FIG. 2B, the tablet device 100 and the rotatable supporting device 300 are rotated along the direction of the arrow 102 to allow the tablet device 100 lying against a back plate 202 of the base 200. The back plate 202 of the base 200 can further equip with a magnetic module 204 to attract the tablet device 100 so as to allow the tablet device 100 firmly lying against the back plate 202 of the base 200.

FIG. 3A illustrates a partial view of the base of the detachable electronic apparatus according to an embodiment of the present invention to describe the assembly processes of the detachable electronic apparatus. FIG. 3B illustrates a back view of the tablet device of the detachable electronic apparatus according to an embodiment of the present invention to describe the assembly processes of the detachable electronic apparatus. As shown in the drawings, the back plate 202 of the base 200 is equipped with at least one magnetic module 204 to attract the tablet device 100. The magnetic module 204 can be disposed at two corners of the back plate 202. Alternatively, the magnetic module 204 can be disposed at a central position of the back plate 202 or any other place on the tablet device 100 to attract the tablet device 100 and allow the tablet device 100 lying against the back plate 202.

Figure 4A:
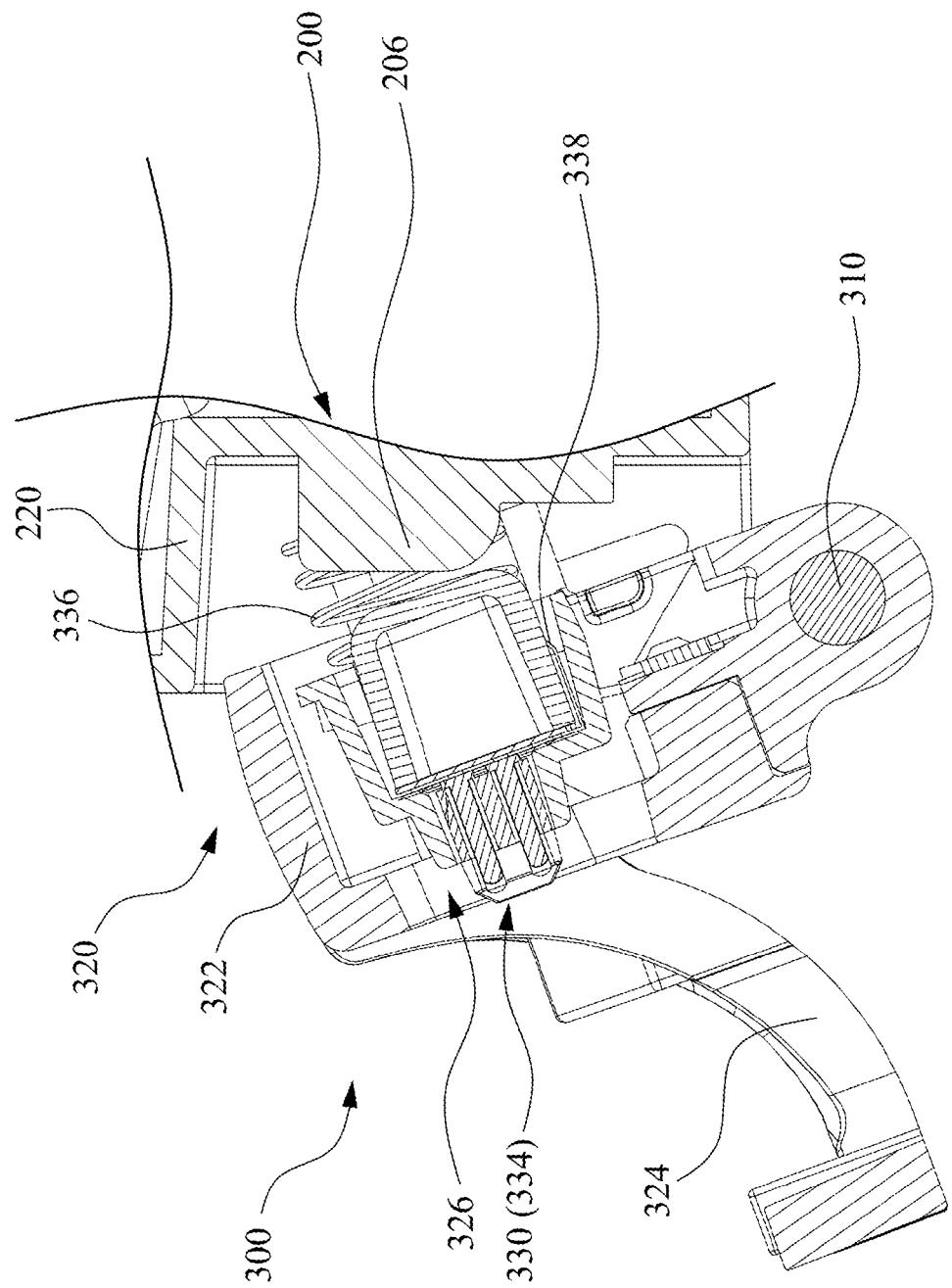
FIG. 4A illustrates an enlarged partial view of a rotatable supporting device of the tablet device of the detachable electronic apparatus according to an embodiment of the present invention to describe the assembly processes of the detachable electronic apparatus of FIG. 2A.
Figure 4B:
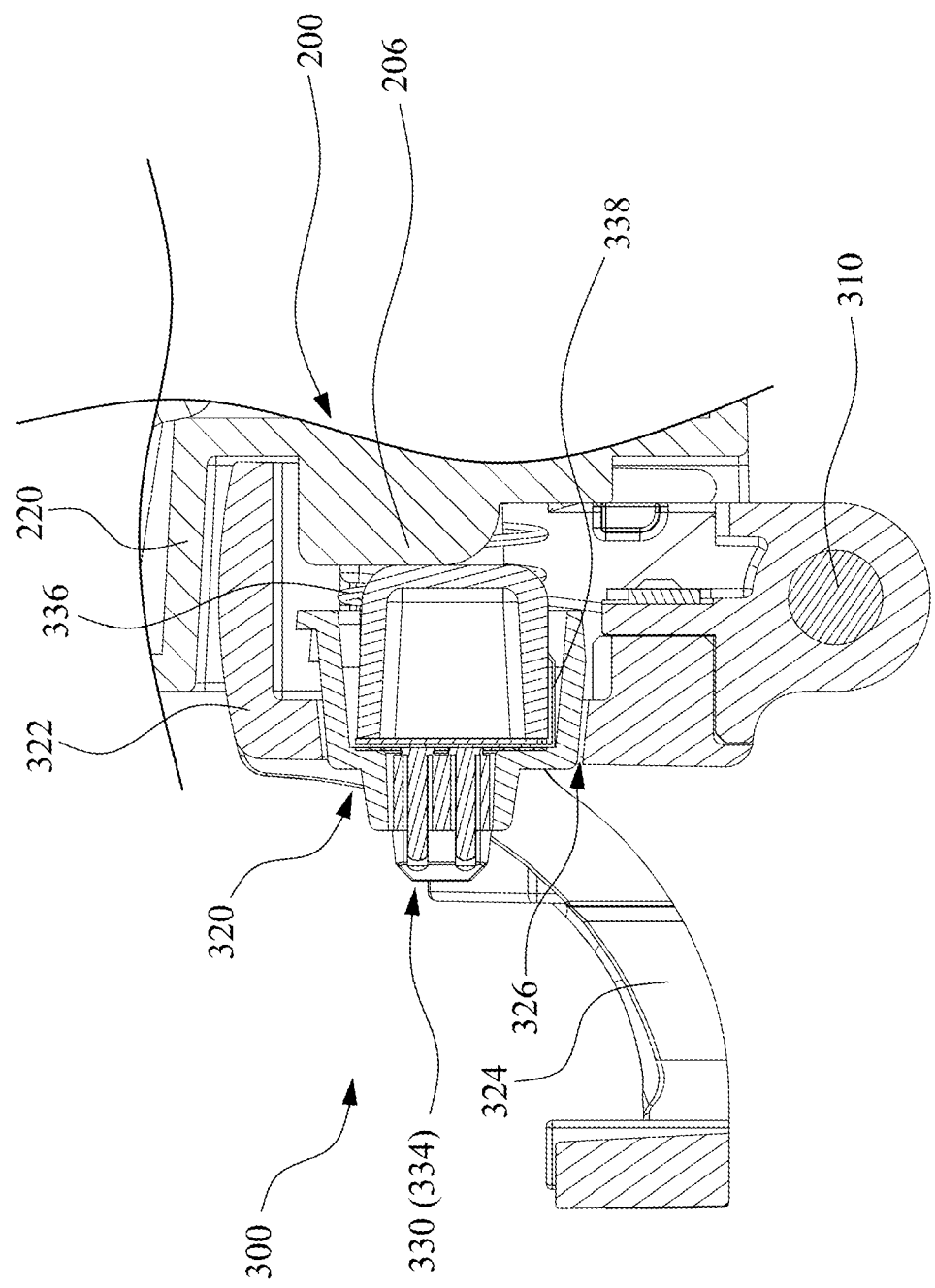
FIG. 4B illustrates an enlarged partial view of a rotatable supporting device of the tablet device of the detachable electronic apparatus according to an embodiment of the present invention to describe the assembly processes of the detachable electronic apparatus of FIG. 2B.

In addition, the rotatable supporting device 300 is assembled at a bottom position of the back plate 202 to support and rotate the tablet device 100. Refer to FIGS. 4A and 4B simultaneously. FIG. 4A illustrates an enlarged partial view of a rotatable supporting device of the tablet device of the detachable electronic apparatus according to the embodiment of the present invention to describe the assembly processes of the detachable electronic apparatus of FIG. 2A. FIG. 4B illustrates an enlarged partial view of a rotatable supporting device of the tablet device of the detachable electronic apparatus according to the embodiment of the present invention to describe the assembly processes of the detachable electronic apparatus of FIG. 2B.

The rotatable supporting device 300 has a hinge 310, a supporting bracket 320 and a connector module 330. The hinge 310 is coupled between the back plate 202 and the supporting bracket 320 so that the supporting bracket 320 can be rotatable around the back plate 202. The connector module 330 is movable and coupled to the supporting bracket 320, for example, the connector module 330 is floatingly connected to the supporting bracket 320, so that the connector module 330 can effectively electrically couple to a corresponding connector 110 of the tablet device 100.

The connector module 330 has a connector 334 and a positioning device 332. The connector module 330 is disposed in an opening 326 of the supporting bracket 320. When the tablet device 100 is removed from the base 200, the connector module 330 is first turned an angle counterclockwise, referring to FIGS. 2A and 4A, and the connector 334 is therefore hidden in the opening 326 of the supporting bracket 320. Accordingly, the tablet device 100 can be installed on or removed from the rotatable supporting device 300 along the direction of the arrow 101. The connector 334 does not interfere with the motion of the tablet device 100.

When the tablet device 100 is installed on the rotatable supporting device 300, the user can further rotate the tablet device 100 and the rotatable supporting device 300 towards the back plate 202. Referring to FIGS. 2B and 4B, the rotatable supporting device 300 can be turned an angle clockwise as well as the rear side of the connector 334 of the connector module 330 is in contact with a stopper 206 of the base 200. Therefore, the stopper 206 pushes the connector 334 of the connector module 330 forwards so that the connector 334 protrudes from the opening 326 of the supporting bracket 320. Therefore, the connector 334 of the connector module 330 can electrically connect to the connector 110 of the tablet device 100 as well as the tablet device 100 is coupled with the base 200.

Furthermore, the connector module 330 has a positioning device 332 to further align the tablet device 100 with the base 200 so that the connector 334 can exactly electrically connect to a corresponding connector 110 of the tablet device 100. After the positioning device 332 couples to the corresponding connecting socket 120 of the tablet device 100, a relative displacement between the tablet device 100 and the connector module 330 can be effectively avoided while operating the detachable electronic apparatus. Alternatively, the connecting socket 120 can also be a single connecting socket having two ends respectively coupling to the positioning devices 332 on both sides of the connector module 330 to avoid a relative displacement between the tablet device 100 and the connector module 330 while operating the detachable electronic apparatus without departing from the spirit and scope of the present invention.

The connector 334 can be a connector with protruding electrical contacts to couple to the corresponding connector 110 of the tablet device 100. Alternatively, the connector 334 can also be a magnetic connector to effectively couple to the corresponding connector 110 of the tablet device 100. In addition, the corresponding connector can be a waterproof connector to improve the waterproof capability of the tablet device 100.

The supporting bracket 320 of the rotatable supporting device 300 further has a supporting base 322 and a supporting arm 324. The supporting base 322 couples to the base 200 with the hinge 310, and the supporting base 322 can be received in the accommodating reservoir 220 of the back plate 202 of the base 200. The supporting base 322 can also move out from the accommodating reservoir 220 of the back plate 202 of the base 200 to allow the connector 334 withdrawing into the supporting base 322. The supporting arm 324 connects to the supporting base 322 and extends outwardly to support the tablet device 100 and limit the motion of the tablet device 100 so that the tablet device 100 can be stably fixed on the rotatable supporting device 300.

The connector module 330 further has a spring 336 to push the connector 334 backward while the rear side of the connector 334 is apart from the stopper 206.

Furthermore, the connector module 330 has a flexible circuit board 338 to electrically connect a circuit board in the base 200 to transmit the signals and power therebetween.

The detachable electronic apparatus according to one embodiment of the present invention utilizes the rotatable supporting device equipped on the back plate of the base to conveniently couple to the tablet device to form an All-in-One computer. In addition, the rotatable supporting device can rotate relative to the back plate of the base so that the connector of the rotatable supporting device can conveniently couple with or decouple from the corresponding connector of the tablet device. The magnetic module on the back plate can effectively fix the tablet device on the base. Furthermore, the tablet device can exactly couple to the base and the connector with the positioning device. Hence, the tablet device and the detachable electronic apparatus according to one embodiment of the present invention can be an All-in-One computer at a stationary place and the tablet device can be easily removed from the base to form a portable tablet device.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A detachable electronic apparatus, comprising:
   a tablet device; and
   a base comprising a back plate and a rotatable supporting device, the rotatable supporting device pivoted on the back plate, wherein the rotatable supporting device further comprises a supporting bracket and a connector module, and the connector module is movable connected to the supporting bracket, when the tablet device is in contact with the back plate, the connector module protruding from an opening of the supporting bracket; when the tablet device is apart from the back plate by rotating the tablet device and the rotatable supporting device, the connector module withdrawing into the opening of the supporting bracket.

2. The detachable electronic apparatus of claim 1, wherein the back plate further comprises a magnetic module to attract the tablet device on the back plate.

3. The detachable electronic apparatus of claim 1, wherein the base further comprises a stopper to push the connector module protruding from the opening of the supporting bracket.

4. The detachable electronic apparatus of claim 1, wherein the rotatable supporting device further comprises a spring disposed between the connector module and the supporting bracket to push the connector module withdrawing into the opening of the supporting bracket.

5. The detachable electronic apparatus of claim 1, further comprising a flexible circuit board connecting between the connector module and a circuit board of the base to electrically connect the tablet device and the circuit board of the base.

6. The detachable electronic apparatus of claim 1, wherein the supporting bracket further comprises a supporting base and a supporting arm.

7. The detachable electronic apparatus of claim 6, wherein the back plate further comprises an accommodating reservoir to receive the supporting base.

8. The detachable electronic apparatus of claim 1, wherein a bottom side of the tablet device further comprises a connecting socket and the connector module further comprises a positioning device locating corresponding to the connecting socket.

\* \* \* \* \*